(12) United States Patent
Benedikt et al.

(10) Patent No.: US 7,286,291 B2
(45) Date of Patent: Oct. 23, 2007

(54) SHOW-THROUGH SECURITY PACKAGING SYSTEM FOR DIGITAL MEDIA

(75) Inventors: Mark L. Benedikt, Kirkland, WA (US); William S. Ballantine, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 11/182,114

(22) Filed: Jul. 15, 2005

(65) Prior Publication Data

US 2007/0014016 A1   Jan. 18, 2007

(51) Int. Cl.
*G02B 5/18*   (2006.01)
(52) U.S. Cl. ............... 359/569; 359/566; 359/1
(58) Field of Classification Search ........... 359/569, 359/566
See application file for complete search history.

(56) References Cited

U.S. PATENT DOCUMENTS

2004/0174806 A1* 9/2004 Johnson et al. ............. 369/284
2004/0255292 A1 12/2004 Benedikt
2004/0255317 A1 12/2004 Benedikt
2005/0005137 A1  1/2005 Benedikt
2005/0021962 A1  1/2005 Benedikt
2005/0121950 A1* 6/2005 Hegarty et al. .......... 297/188.01
2005/0185552 A1  8/2005 Benedikt

* cited by examiner

*Primary Examiner*—Fayez G. Assaf
(74) *Attorney, Agent, or Firm*—Vierra Magen Marcus & DeNiro LLP

(57) ABSTRACT

A system of visual authentication of digital media. A visual means is provided at the point of purchase for a user to verify that the source of software is genuine. An authentication image is embedded into a portion of a media. The authentication image is not visible to the naked eye. Embodiments of the invention further include a view port integrated in the packaging for the media. The viewing port includes a decoder lens that allows the user to see the hidden authentication image, marking the authenticity of the media.

20 Claims, 11 Drawing Sheets

SHOW-THROUGH SECURITY PACKAGING SYSTEM FOR DIGITAL MEDIA

BACKGROUND OF THE INVENTION

1. Field of the Invention

The present invention is directed to a system of visual authentication of digital media.

2. Description of the Related Art

Each year, software piracy drains the U.S. economy of billions of dollars and thousands of skilled high-paying jobs. Technological developments which have made it easier for software manufacturers to provide inexpensive products have also made it easier for software pirates to cheaply replicate and profitably market large volumes of optical media such as CDs and DVDs. This software piracy is also fueling organized crime.

There are many different types of software piracy. End-user piracy is the copying of software without appropriate licensing for each copy. Pre-installed software piracy is when a computer manufacturer takes one copy of software and illegally installs it on more than one computer. Internet piracy is the downloading of unauthorized software over the Internet. And counterfeiting is the making and distribution of illegal copies of software in packaging that replicates a legitimate manufacturer's packaging. Counterfeit media range in quality from hand-labeled recordable CDs to high quality replicas of genuine installation CDs.

Since the early 1990s, Microsoft Corporation has been using anti-counterfeiting technology, including holographic images to help protect its intellectual property, its customers, and channel partners. One such measure is a certificate of authenticity ("COA"), which is a label affixed to packaging for genuine software. The COA is embedded with security features that verify authenticity of a product. The COA may include various visual identifiers, such as product ID and product Key code numbers used to activate the product. The COA may also include physical properties, such as for example a metallic thread woven into the label to indicate that the associated software is genuine.

Various holograms have been added to the non-data side of pre-recorded and recordable optical media for additional security against counterfeiting. A variety of different holograms are used to make replication more difficult and to improve security. Current optical media for Microsoft include an inner mirror band hologram, which is a detailed holographic image located on the inner mirror band of the non-data side of optical media that changes color as the optical media is tilted. Microsoft further provides a stereogram on their optical media, which is a high resolution 3-dimensional hologram, such as for example of the Microsoft logo, that changes color and shape as the optical media is tilted. Microsoft optical media may further include a medallion located at an edge of the CD including an image which morphs between the word "Microsoft" and "Genuine" as a CD is tilted. Microsoft optical media further include background holograms including a clean wavy or feathered edge and vibrant colors as the optical media is tilted.

While these security measures have proven effective to a degree in the past, software piracy is becoming more sophisticated. Additional security measures are required having more advanced features in an attempt to stay ahead of the counterfeiters.

SUMMARY OF THE INVENTION

Embodiments of the present invention are directed to a system of visual authentication of a source of digital media, such as for example optical media including CDs and DVDs. The system includes a digital media having a visual image not visible to the naked eye, and packaging for the digital media, the packaging having one or more view ports providing a direct line of site to a surface of the digital media within the packaging. The system further includes a decoding lens provided within the view port, the decoding lens capable of revealing the visual image on the digital media.

The decoding lens in the packaging and visual image on the media may be of the kind used in concealed image technologies, and together provide a "lock and key" system that is difficult for counterfeiters to reproduce. The decoding lens may be a variety of configurations, including for example a diffraction grating, which may be integrated into a wide variety of packaging in which media is packaged and sold. The visual image may be incorporated electronically into the image data for the image that is applied on the media, and can be applied with a variety of printing techniques. In embodiments of the present invention, the view port may be provided through one or more layers of packaging to provide a direct line of sight to a digital media. In embodiments including more than one layer of packaging over an authentication image, the decoder lens could be provided within one of the view ports thus formed.

Packing for media may be formed from opaque and clear materials. In embodiments where the packaging is opaque, the decoder lens may be formed on a transparent insert, such as clear plastic, which is inserted into a view port formed in the packaging either during or after package fabrication. Where the packaging is clear, the decoder lens may be formed directly on the packaging. In such embodiments, the view port may be the area on the packaging surrounding the decoder lens.

The authentication image may be applied to the surface of the media before or after data is recorded on the media, and before, during or after other security features such as holograms are provided on the non-data carrying surface of the media. In embodiments, the media is oriented as desired before placing the media in the packaging to ensure the authentication image aligns with the view port in the sealed packaging. The media may be fastened in the desired orientation in the packaging, as for example by tape, to ensure that the authentication image remains aligned with the view port after the media is packaged.

BRIEF DESCRIPTION OF THE DRAWINGS

The present invention will now be described with reference to the figures.

DETAILED DESCRIPTION

The present invention will now be described with reference to FIGS. 1-20, which embodiments relate to a system of visual authentication of a source of digital media. The invention provides a visual means at the point of purchase for a user to verify that software is genuine. In embodiments, an authentication image such as a hologram, stereogram or hidden text is embedded into a portion of a media. The authentication image is not visible to the naked eye. Embodiments of the invention further include a view port integrated in the packaging for the media. The viewing port includes a decoder lens that allows the user to see the hidden authentication image, marking the authenticity of the media.

Embodiments of the present invention are described hereinafter with respect to optical media, such as for example compact disks ("CDs"), DVDs, high definition DVDs ("HD-DVDs"), and Blu-Ray disks. However, it is understood that the authentication security system according to embodiments of the present invention may be used with any digital delivery system, including for example USB devices such as EEPROMS, as well as a variety of hardware devices.

Figure 3:
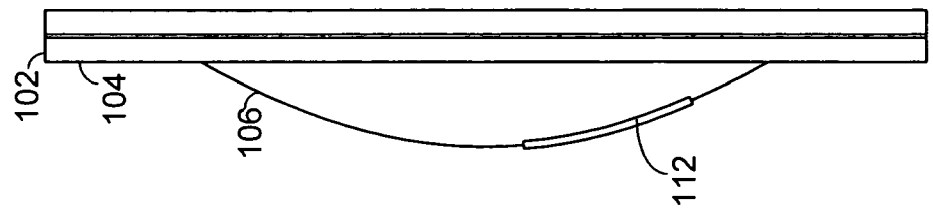
FIG. 3 is a side view similar to FIG. 2 with an authentication security system according to an alternative embodiment of the present invention.
Figure 2:
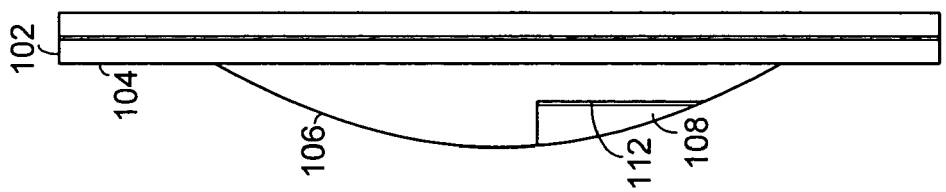
FIG. 2 is a side view of the packaging shown in FIG. 1, including the authentication system according to embodiments of the present invention.
Figure 1:
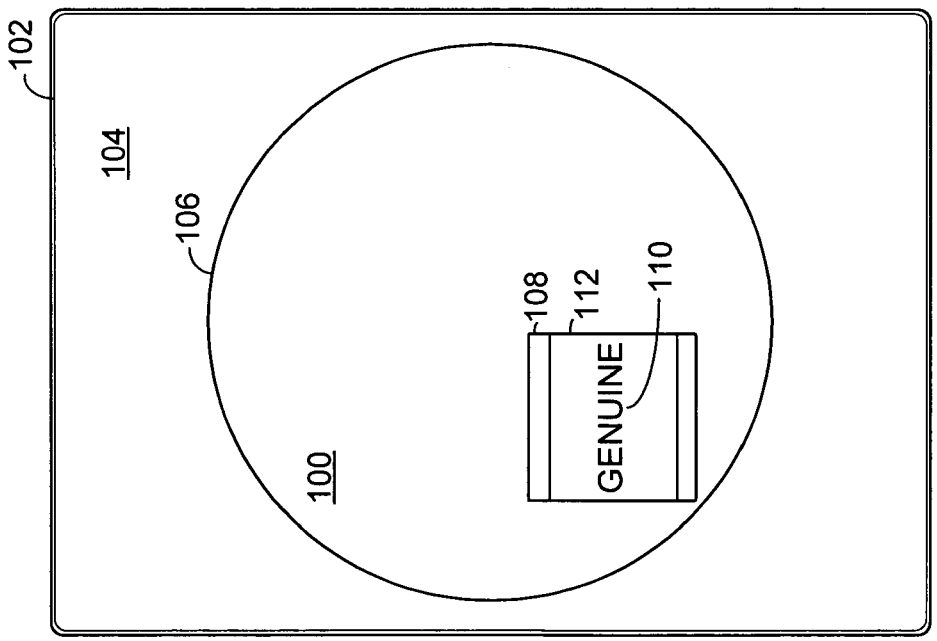
FIG. 1 is top view of an optical disk and bubble packaging therefore, in disk and packaging including an authentication system according to embodiments of the present invention.

FIGS. 1 and 2 are top and side views, respectively of a digital media 100 within packaging 102 in which the media may be sold. As used herein, the term "media" is used to refer to both a single media (e.g., a single optical disk) and a plurality of media (e.g., two optical disks). As explained hereinafter, the type of packaging used in embodiments of the present invention is not critical and may vary significantly in alternative embodiments. In the embodiment shown in FIGS. 1 and 2, packaging 102 may be formed of plastic, and includes a planar portion 104 and a raised spherical portion, or bubble, 106.

Other materials from which packaging 102 may be formed include paper, paperboard, cardboard, corrugated cardboard, a variety of other fiber-based materials, cellophane, other thermoplastic or thermosetting polymers, film packaging, shrink film, shrink wrap, stretch wrap, molded pulp packaging, metal, foam packaging and cornstarch-based packaging called NatureWorks™ PLA Packaging from Cargill Dow LLC, Minnetonka Minn. Other thermo- (and otherwise) formable materials, injection molded materials, and other materials from which packaging is formed may be used. Combinations of the above-identified materials may also be used. Some of these materials are illustrated in the drawings as explained hereinafter.

The digital media 100 is positioned beneath bubble 106. According to embodiments of the invention, a view port 108 may be integrated into packaging 102, on bubble 106, as shown in FIGS. 1 and 2. View port 108 provides a direct line of sight to an authentication image 110 formed on digital media 100.

When not viewed through view port 108, authentication image 110 is not visible to the naked eye (i.e., when viewed with the naked eye, authentication image 110 does not reflect light waves in the visible spectrum). However, according to embodiments of the invention, view port 108 includes a decoder lens 112 having optical properties tuned to the authentication image. Thus, when the authentication image is viewed through decoder lens 112, the authentication image is visible to the naked eye. In the embodiment of FIG. 2, the view port is shown in a depression formed in the bubble 106 so that the decoder lens is formed on a surface of the packaging 102 generally parallel to the surface of the media 100. However, in alternative embodiments, the decoder lens may be formed directly on the spherical surface of bubble 106. Thus, in FIG. 3 for example, the depression in the bubble 106 is omitted, and the decoder lens 112 is formed on the bubble 106 over the authentication image 110. The view port in this embodiment is simply an area on the bubble surrounding the decoder lens 112. As explained hereinafter, the packaging 102 may be flat, and the decoder lens otherwise formed on a flat portion of packaging 102. In embodiments where packaging is opaque, view port 108 is formed as an opening through the packaging and an insert including the decoder lens is provided in the opening as explained in greater detail below.

Any of various known concealed image technologies may be used to conceal authentication image 110 when viewed without decoder lens 112, and to make authentication image 110 visible when viewed through decoder lens 112. Such concealed image technologies are available, for example from Starboard Technologies of Or Akiva, Israel. Concealed image technologies which may be used in the present invention use encrypted 2D and 3D elements integrated into a printed image. Such a system may be thought of as a lock and key system; that is, the image is locked, i.e., invisible, and may only be made visible with the key, i.e., the decoder lens. This type of system is difficult to reproduce and/or counterfeit.

As used herein, decoder lens 112 may refer to any medium for visually revealing an image otherwise hidden from view by the naked eye according concealed image technology. In embodiments, decoder lens 112 may comprise a diffraction grating. A diffraction grating is a patterned array of small, parallel, equally spaced lines that mutually enhance the effects of diffraction to concentrate the diffracted light in a few directions determined by the spacing of lines and by the wave length of the light. Both transmission amplitude grating and transmission phase grating may be used for decoder lens 112 in embodiments of the invention. Decoder lens 112 may alternatively comprise a polarization filter, a color filter, or other known technology enabling an otherwise invisible or obscured image to be viewed.

Decoder lens 112 may take up the entire view port 108 or a portion of view port 108 in embodiments of the invention. The size of view port 108 and decoder lens 112 will, in embodiments, be determined, at least in part, by the size of the authentication image on media 100. As explained hereinafter, the size of the authentication image on media 100 may vary in alternative embodiments.

In embodiments, decoder lens 112 is large enough so that the entire authentication image 110 may be viewed through the lens 112. In alternative embodiments however, the decoder lens 112 may be smaller than the authentication image 110 so that only a portion of the authentication image 110 may be viewed through decoder lens 112. In such embodiments, the portion of authentication image 110 that is visible through decoder lens 112 would be sufficient to verify the authenticity of digital media 100.

As explained hereinafter, view port 108 and decoder lens 112 may be integrated into a variety of different packaging. In embodiments where packaging 102 is formed of a translucent material, such as a hard or soft plastic, NatureWorks™ PLA, etc., decoder lens 112 may be formed directly in the surface of the packaging. Alternatively, the decoder lens may be formed on an insert, such as cellophane, plastic or other translucent material, and applied to the packaging with an adhesive or the like. As used herein, translucent includes clear materials, tinted materials and materials otherwise allowing light to pass therethrough.

In embodiments where packaging comprises cardboard, opaque plastic, or other opaque material, a window may be formed in the packaging for receipt of decoder lens 112. In such embodiments, the view port may itself simply be a hole in the packaging for receipt of an insert including the decoder lens. The insert may be a rigid material, such as hard plastic, mounted within the hole. Alternatively, the insert may be a flexible material, such as cellophane, applied with an adhesive to the area around the hole so that the decoder lens is positioned over the hole.

In embodiments, the view port may be a clear material integrated with the surrounding opaque portions of the packaging. The decoder lens insert may then be applied to the clear material as described above to form the decoder lens and view port. The shape of the view port may vary in alternative embodiments, but may be square, rectangular, circular, ovoid, elliptical, triangular, polygonal, or irregular shaped.

Authentication image 110 may be applied to a digital media 100 in accordance with a variety of known concealed image technologies. In one embodiment, the authentication image is incorporated electronically into the image data for the image to be applied on the media 100, and can be applied with a variety of printing techniques. The authentication image has an advantage that it is difficult or impossible to reproduce, as scanners capture only the visible image and not the hidden authentication image, making it more difficult to counterfeit. The image 110 can be recorded directly onto a non-data surface of the digital media, or the authentication image may be formed on an independent medium, such as an adhesive label, which is subsequently affixed to the surface of digital media 100.

Authentication image 110 may be formed at a variety of positions on digital media 100. In embodiments, the authentication image may take up a small, regular, or irregular shaped portion of media 100 between the inner and outer diameter of the media, such as shown in the figures. In alternative embodiments of the invention, the authentication image may be applied in an annular configuration concentric with an outer diameter of digital media 100. In such embodiments, the annular configuration may be a small ring or the annular band over all or substantially all of the non-data carrying surface of digital media 100.

The image itself, when viewed through decoder lens 112, may be a 2D or 3D image, and may be a hologram or a stereogram. When viewed through decoder lens 112, the authentication image 110 may be any of a variety of objects, logos, sentences, phrases, words, letters, numbers, images, and combinations thereof. The authentication image 110 may be a product ID and/or product key code number required to activate the product. In some embodiments of the invention shown in the figures, authentication image 110 comprises letters spelling the word "GENUINE" when seen through decoder lens 112. In embodiments, for example where a serial number or identifier is used, part of the number/identifier may be provided on the packaging, or on the decoder lens, and the remaining portion of the number/identifier be in the authentication image.

The image 110 may be static; that is, the image does not change upon tilting the disk while being viewed through decoder lens 112. In alternative embodiments, the image may be dynamic. In such embodiments, the image may morph as the media 100 is tilted when viewed through decoder lens 112. For example, as the media 100 is tilted, the authentication image may change from "MICROSOFT" to "GENUINE" to "MEDIA." Those skilled in the art will appreciate that different digital media may include different authentication images 110, and that the authentication image on media for a given software application program may be changed periodically in new runs of digital media for that program.

The authentication security system according to the present invention may be applied to any packaging for digital media in which a view port 108 may be formed to provide a direct line of sight to the authentication image on the media housed within the packaging. In embodiments, the authentication image 110 may only be applied to the non-data carrying side of the digital media, such as for example optical media. However, it is contemplated in the future that it may be possible to form authentication image 110 on the data carrying side of digital media.

FIGS. 1-17 provide some examples of packaging within which the authentication security system according to embodiments of the present invention may be employed. These embodiments are merely illustrative, and by no means are the illustrated embodiments to be construed as an exhaustive disclosure of the types of packaging in which the authentication security system of the present invention may be employed. The authentication security system according to the present invention may be employed in packaging beyond that shown in the figures in alternative embodiments.

As discussed above, FIGS. 1-3 illustrate bubble packaging for optical media, with the decoder lens 112 formed on the bubble portion of the packaging.

Figure 4:
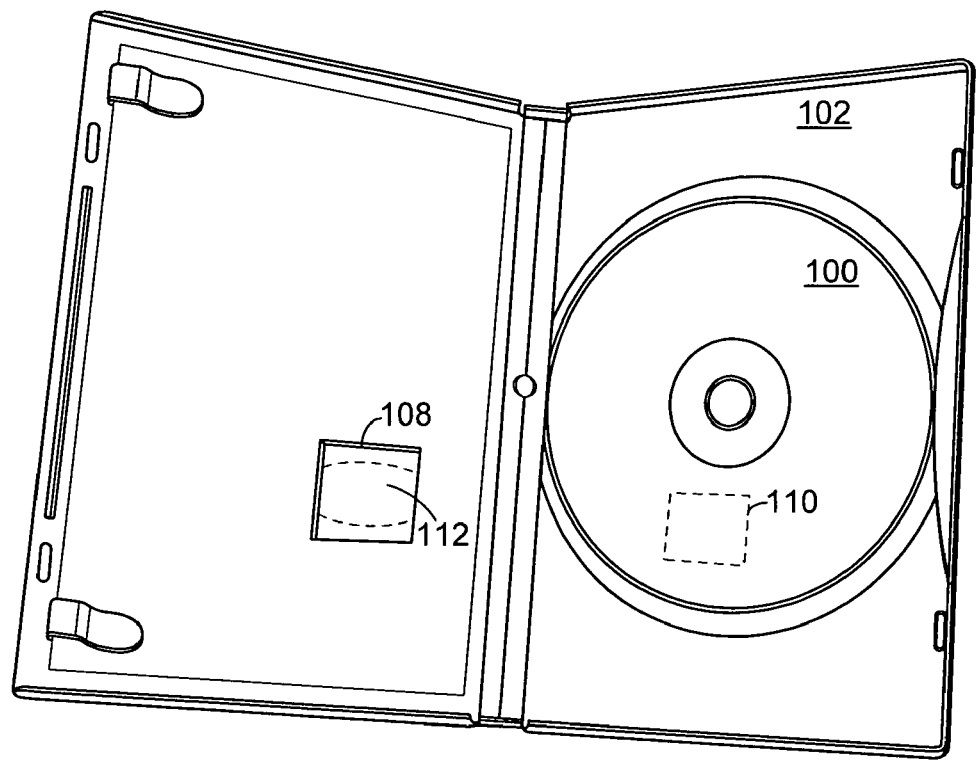
FIG. 4 is a view of an optical disk and a DVD packaging, the disk and packaging including an authentication security system according to embodiments of the present invention.

FIG. 4 is a view of an optical media 100 which may for example be a DVD and packaging 102 in which the media may be housed. The packaging includes a view port 108 and decoder lens 112, and the media 100 includes an authentication image 110. As the view of media 100 shown in FIG. 4 is not through the view port 108, the authentication image 110 would not in fact be visible. However, the authentication image 110 is shown in dashed lines in FIG. 4 for illustrative purposes. In FIGS. 5-17, where the authentication image is not seen through the view port, the image is similarly shown in dashed lines for illustrative purposes.

Figure 5:
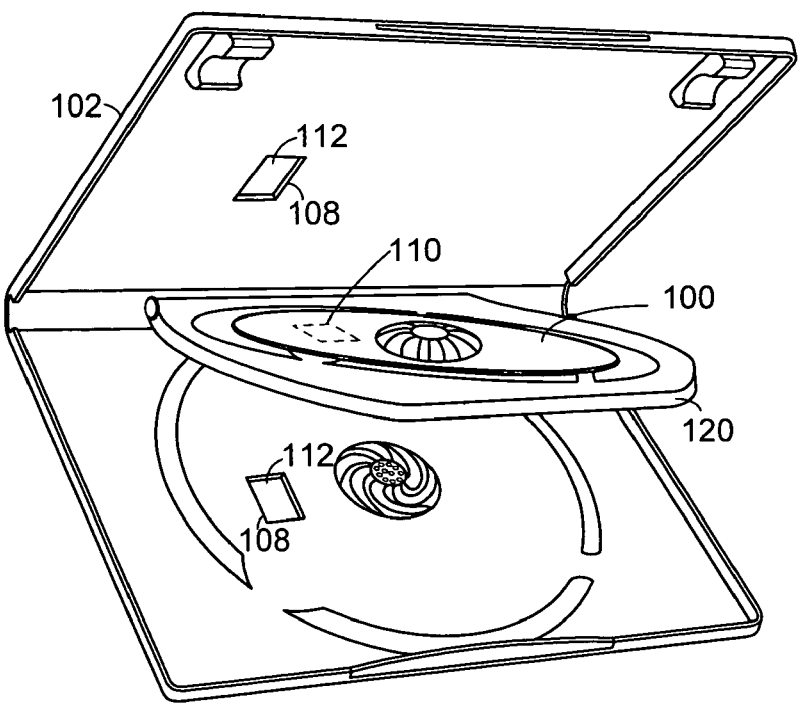
FIG. 5 is a view of multiple disks in a multiple DVD packaging, the disks and packaging including an authentication security system according to embodiments of the present invention.

FIG. 5 is a view of multiple media 100 in a multiple DVD packaging 102 (a single media is visible on a first side of flap 120; a second media (not seen) may be provided on the second side of flap 120). An image 110 may be provided on each media in the packaging, and multiple view ports 108/decoder lenses 112 may be provided in packaging 102, one for each media.

Figure 6:
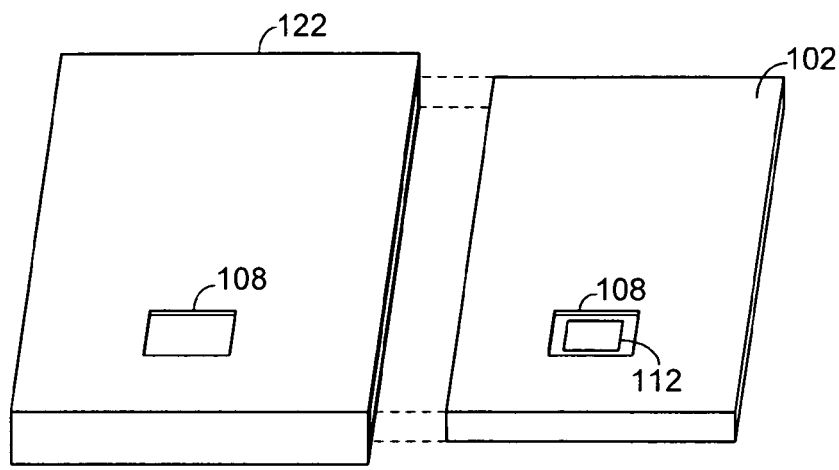
FIG. 6 is similar to FIG. 4 with the addition that the packaging is inserted in an outer sleeve, the sleeve including an authentication security system according to embodiments of the present invention.

FIG. 6 is similar to FIG. 4 with the addition that the packaging 102 is inserted in an outer sleeve 122, also forming part of the packaging. As shown, both the packaging 102 and sleeve 122 may include view ports 108 that align with each other when the packaging is inserted into the sleeve. One of the packaging and sleeve may include the decoder lens 112.

Figure 7:
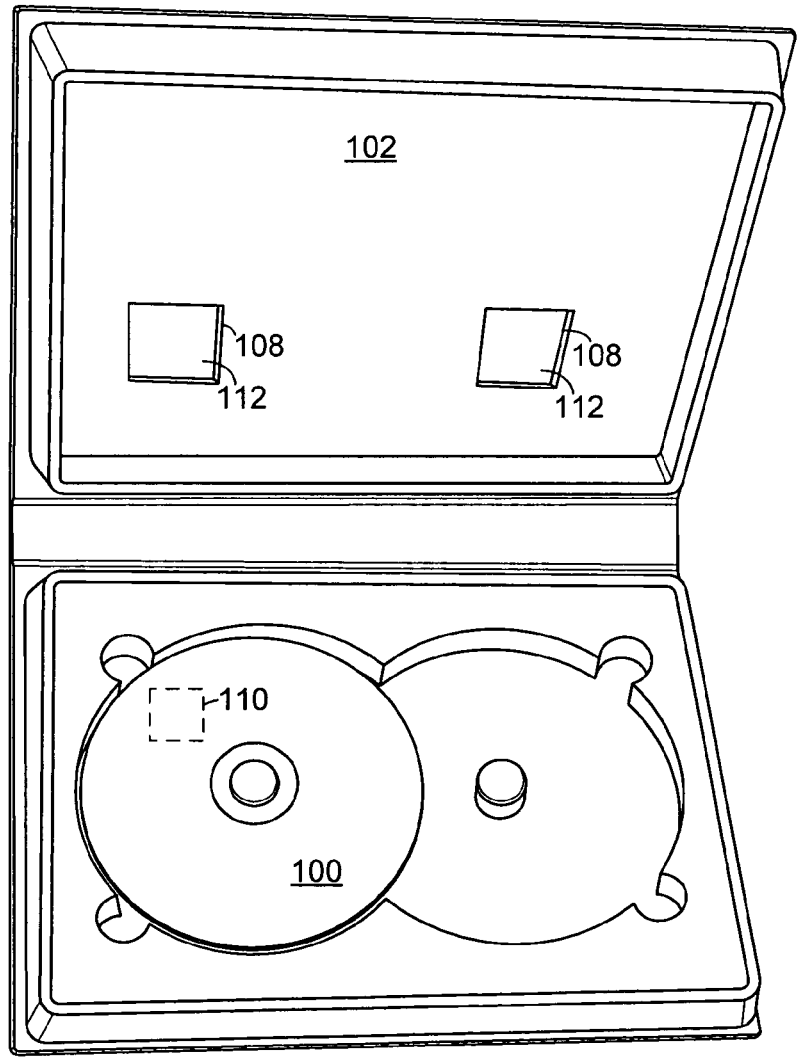
FIG. 7 is a view of a disk in so-called bespoke packaging, the disk and packaging including an authentication security system according to embodiments of the present invention.

FIG. 7 is a view of a media 100 in so-called bespoke packaging capable of holding two or more media (one media shown in FIG. 7). The packaging cover 102 may include view ports/decoder lenses that align with the authentication image on respective media within the package 102.

Figure 8:
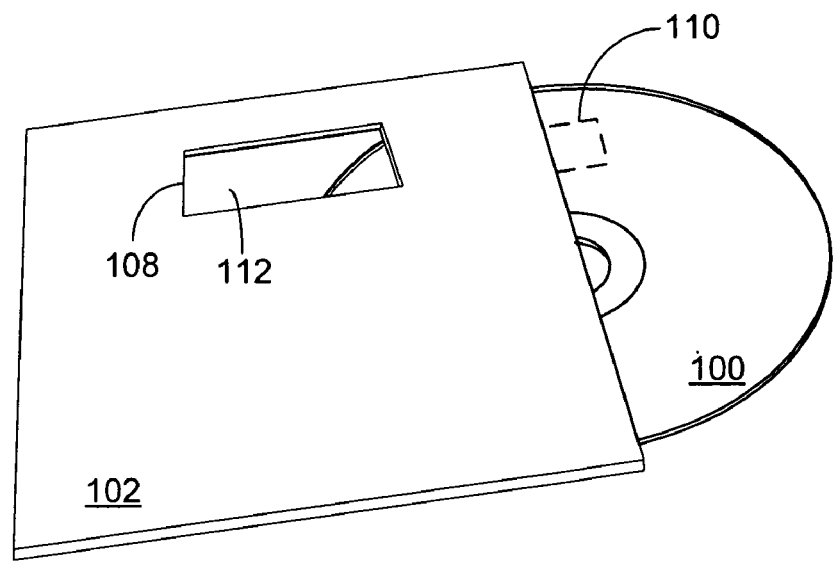
FIG. 8 is a view of an optical disk and packaging for the disk, the disk and packaging including an authentication security system according to embodiments of the present invention.

FIG. 8 is a view of an optical media 100 partially inserted into its cardboard or paper packaging 102. As explained above, the packaging in which the present invention may be used is not limited to cardboard and paper packaging material, and may included with a wide variety of other materials. Media 100 includes an authentication image 110, and packaging 102 includes a view port 108 and a decoder lens 112.

Figure 9:
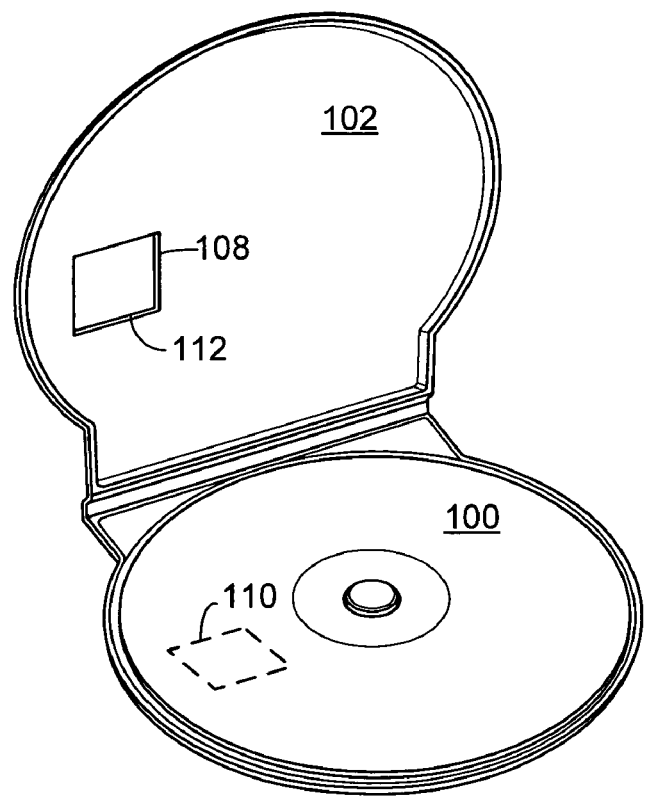
FIG. 9 is an optical disk and a clam shell packaging for the disk, the disk and clam shell packaging including an authentication security system according to embodiments of the present invention.

FIG. 9 is an optical media 100 and a clam shell packaging 102 for the media. Media 100 includes an authentication image 110, and packaging 102 includes a view port 108 and a decoder lens 112. Clam shell packaging is known that is transparent. The decoder lens 112 may be formed directly on a portion of the claim shell packaging to align with the image 110 when the packaging is closed. Clam shell packaging is also known that is opaque or semitransparent. In such embodiments, a view port 108 may be formed in the packaging and an insert including the decoder lens mounted in the view port.

Figure 10:
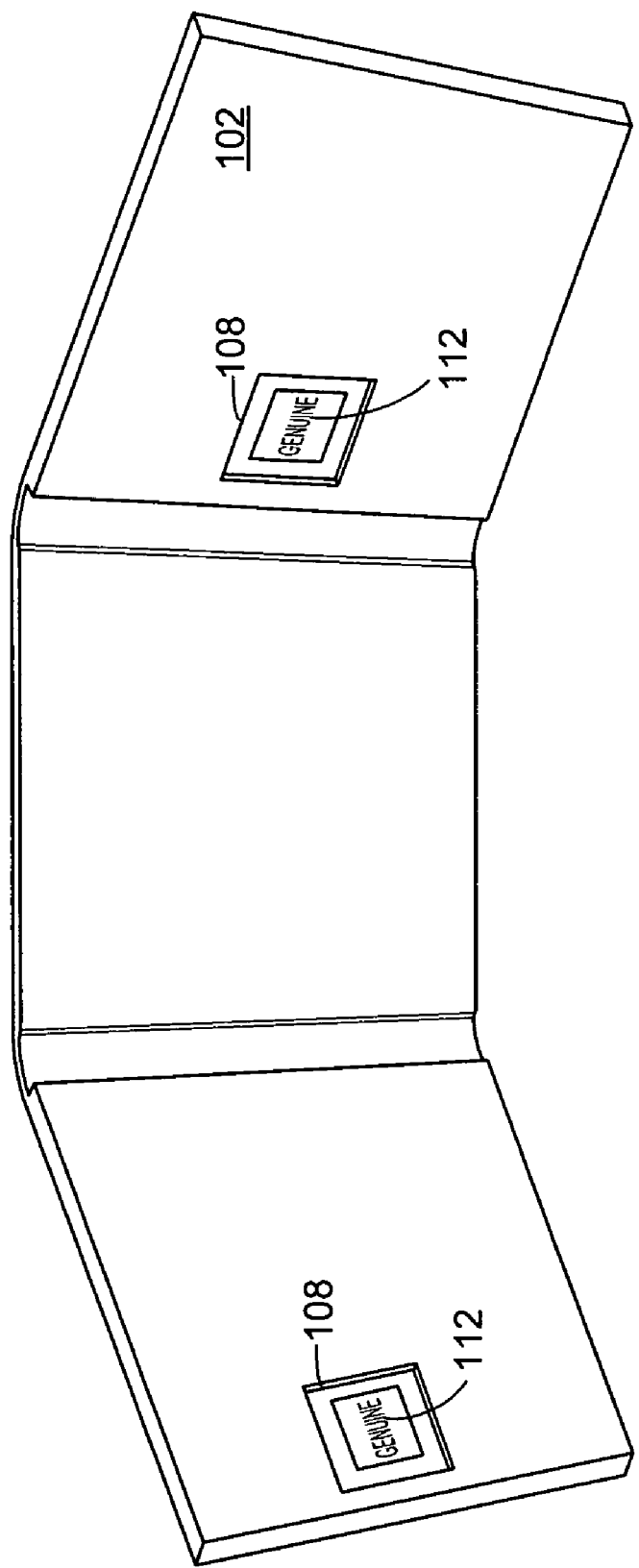
FIG. 10 is a view of one or more optical disks and three-sided packaging for the disks, the disks and packaging including an authentication security system according to embodiments of the present invention.

FIG. 10 is a view of one or more optical media and three-sided packaging for the media. An image 110 may be provided on each media in the packaging, and multiple view ports 108/decoder lenses 112 may be provided in packaging 102, one for each media.

Figure 11:
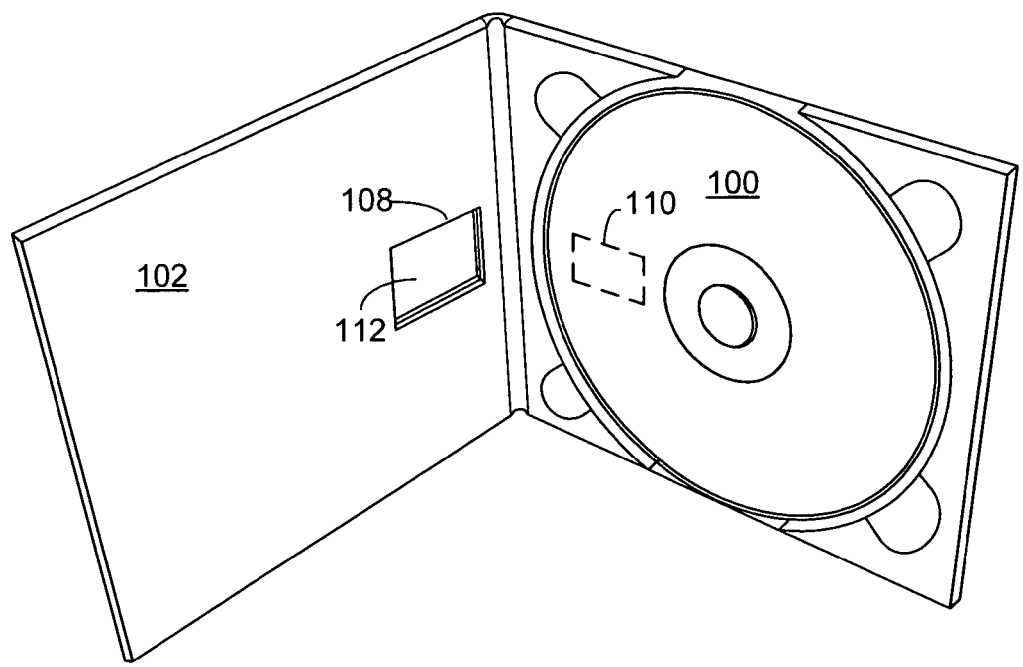
FIGS. 11 and 12 are views of an optical media in a CD case and a so-called jewel case, respectively, the media and cases including an authentication security system according to embodiments of the present invention.
Figure 12:
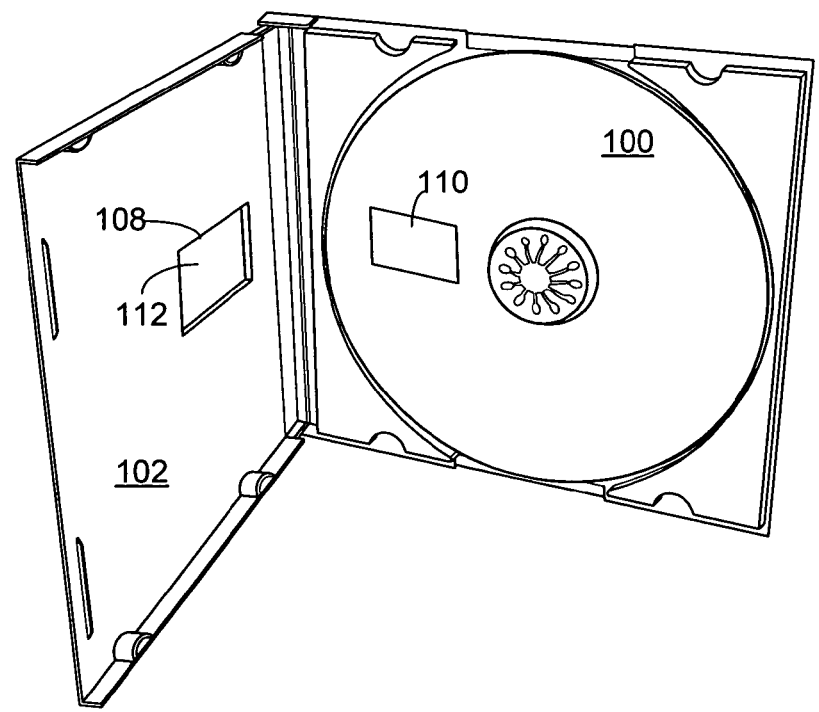

FIGS. 11 and 12 are views of an optical media 100 in a CD case 102 and a so-called jewel case 102, respectively. Media 100 includes an authentication image 110, and packaging 102 includes a view port 108 and a decoder lens 112.

Figure 13:
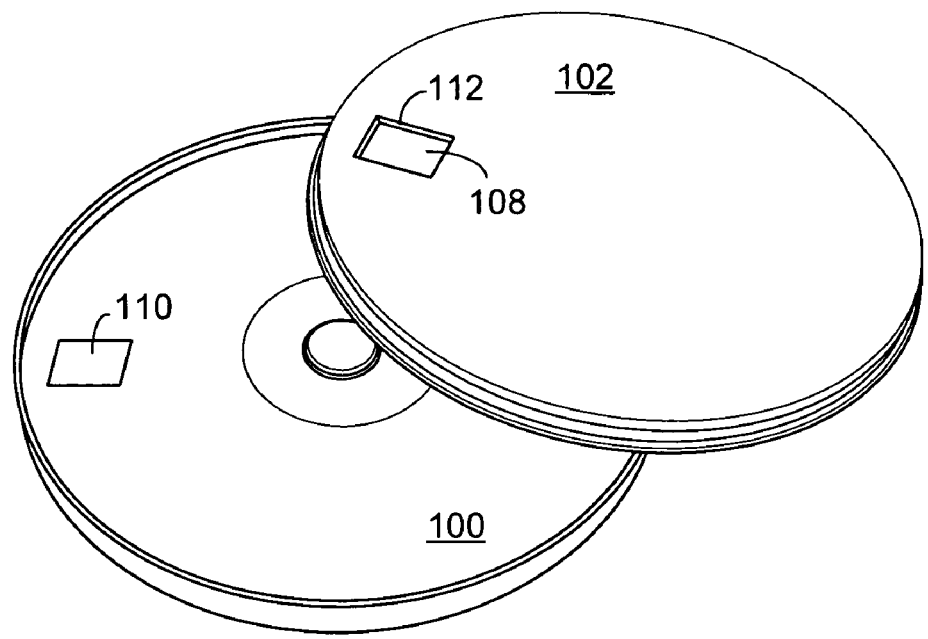
FIG. 13 is a view of one or more optical disks and a tin or metal case for the disks, the one or more disks and case including an authentication security system according to embodiments of the present invention.

FIG. 13 is a view of an optical media and a tin or other metal case for the media. Media 100 includes an authentication image 110, and packaging 102 includes a view port 108 and a decoder lens 112.

Figure 14:
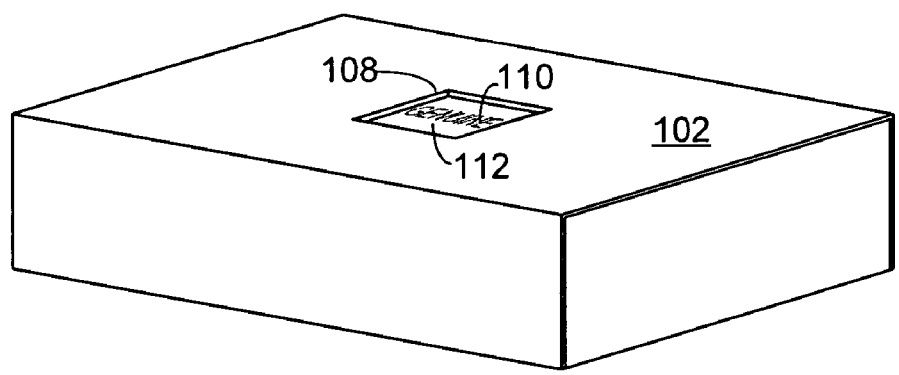
FIG. 14 is a view of a box in which optical media may be packaged together with documentation and/or hardware, the box and optical media including an authentication security system according to embodiments of the present invention.

FIG. 14 is a view of a box 102 in which an optical media may be packaged together with documentation and/or hardware. The media includes an authentication image 110, and packaging 102 includes a view port 108 and a decoder lens 112. As would be appreciated, the media may be located at different positions within the box 102. In embodiments, the surface of the media including the authentication image is provided adjacent some surface of the box 102, and the view port positioned accordingly to provide a direct line of sight to the authentication image.

Figure 15:
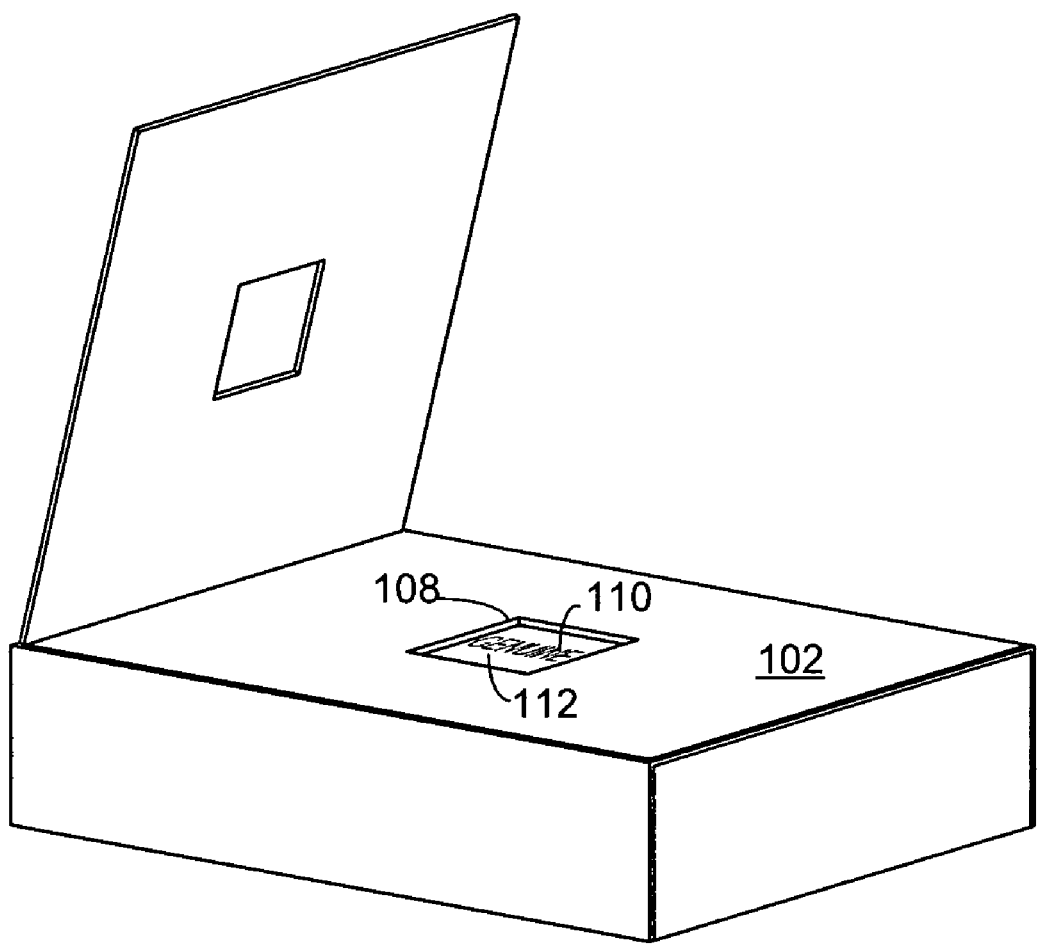
FIG. 15 is similar to the embodiment of FIG. 14, with the box having an additional cardboard flap affixed to a surface of the box.

FIG. 15 is similar to the embodiment of FIG. 14, with the box having an additional cardboard flap 126 affixed to a surface of the box. Both the packaging 102 and flap 126 may include view ports 108 that align with each other when the flap is closed. One of the packaging and flap may include the decoder lens 112.

Figure 16:
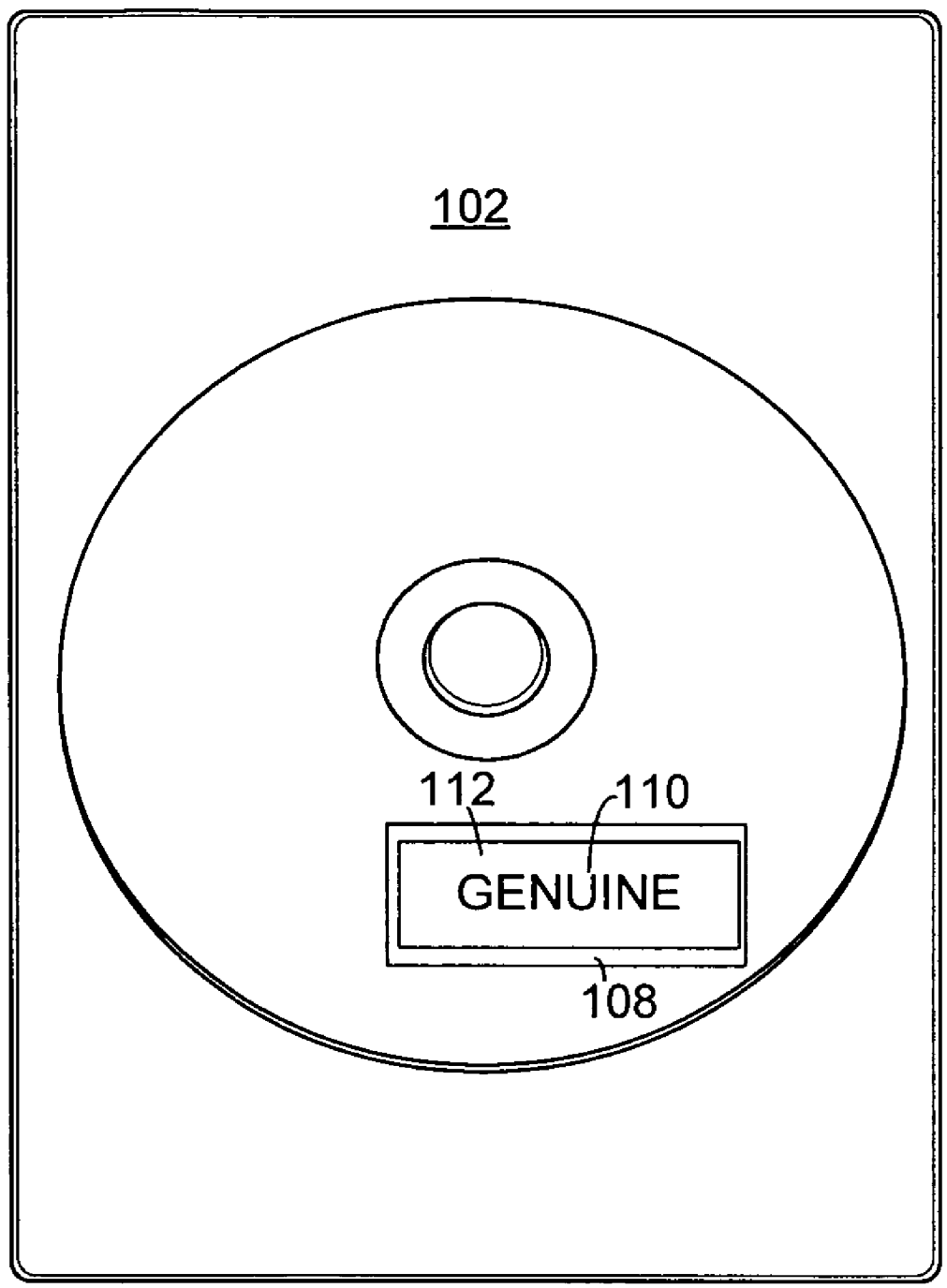
FIG. 16 is a view of an optical disk within soft plastic packaging, the disks and packaging including an authentication security system according to embodiments of the present invention.

FIG. 16 is a view of an optical disk a within soft plastic packaging 102. Disk 100 includes an authentication image 110, and packaging 102 includes a view port 108 and a decoder lens 112.

Figure 17:
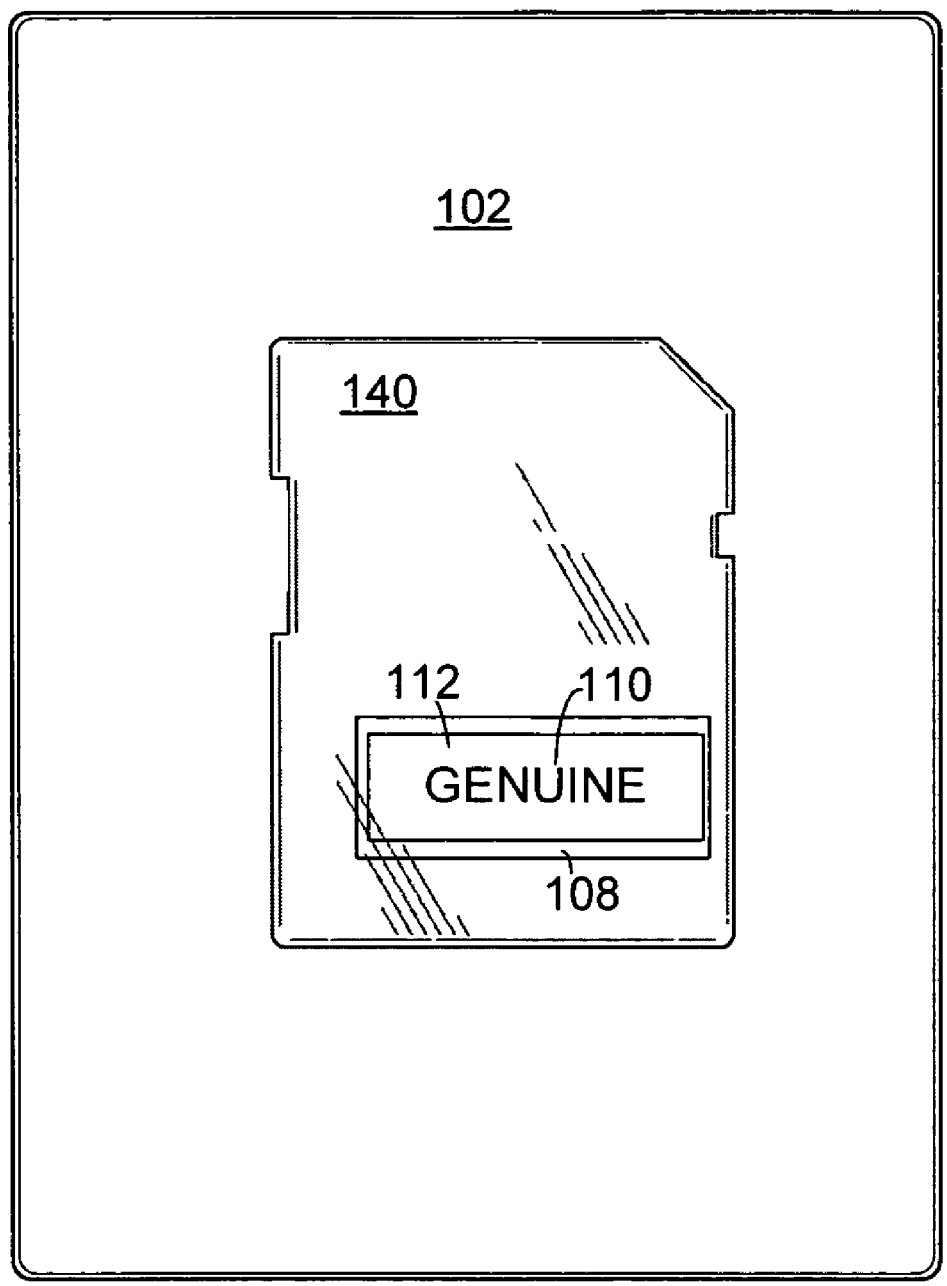
FIG. 17 is a view of a flash memory and packaging for the device, the packaging including an authentication security system according to embodiments of the present invention.

FIG. 17 is a view of a memory storage device 140 and packaging 102 for the device. The memory storage device includes an authentication image 110, and packaging 102 includes a view port 108 and a decoder lens 112. While a flash memory is shown, it is understood that a variety of other memory storage and bit delivery devices, including USB devices and other hardware items may be used. Each such device may include an authentication image and be sold within a package including one or more view ports and a decoder lens in further embodiments of the invention.

As may be seen in the drawings, in embodiments of the present invention, aligned view ports 108 may be provided through more than one layer of packaging to provide a direct line of sight to digital media 100. In such embodiments, decoder lens 112 could be provided within one of the view ports thus formed.

Figure 18:
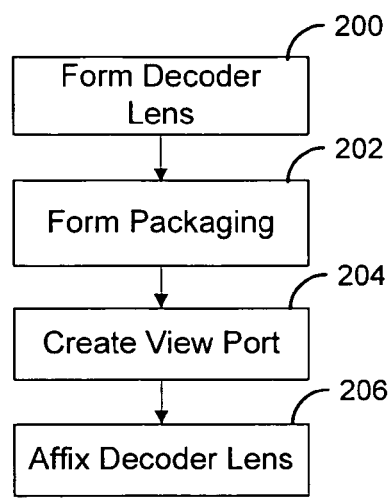
FIG. 18 is flowchart of a manufacturing process for packaging including a portion of the authentication security system according to embodiments of the present invention.

A flowchart for the manufacture of packaging including view port 108 and decoder lens 112 is shown in FIG. 18. In FIG. 18, the packaging is formed of an opaque material. In step 200, decoder lens 112 may be formed on a transparent insert as is known in the art. The material for the insert may be clear plastic, but may be other clear materials in alternative embodiments. In step 202, the packaging is formed as is known in the art. In step 204, a view port is created in the packaging at a position on the packaging so as to provide a clear line of sight to the digital media within the package. In step 206, the decoder lens may be affixed within the view port to complete the packaging. The insert may be affixed within the view port as by adhesives, sonic welding and other known affixation methods.

It is understood that the step 204 of creating the view port and the step 206 of mounting the decoder lens into the view port may occur after step 202 of forming the packaging or during the step 202 of forming the packaging. For example, where the packaging is formed of cardboard, the cardboard may be formed into the finished packaging, and then a view port punched out of the cardboard at the desired location, with the decoder lens thereafter mounted within the view port. Alternatively, for example where the packaging is formed of hard plastic, the view port may be created during the injection molding process for the plastic packaging, and the decoder lens insert added before the plastic sets so as to become part of the package.

Figure 19:
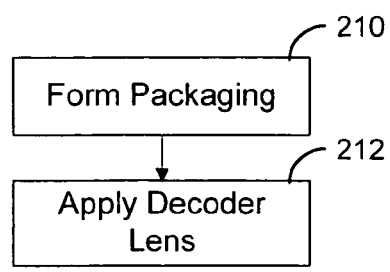
FIG. 19 is flowchart of a manufacturing process for alternative packaging including a portion of the authentication security system according to embodiments of the present invention.

FIG. 19 illustrates a fabrication process for forming a decoder lens on transparent packaging, such as for example clear plastic packaging. In such an embodiment, the clear plastic packaging may be formed in a step 210 and then decoder lens may be formed at a desired location on the plastic packaging in a step 212.

Figure 20:
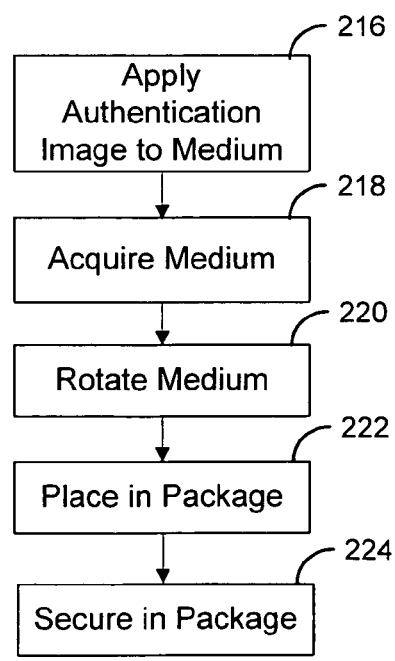
FIG. 20 is a flowchart of the manufacturing process for media including a portion of the authentication security system according to embodiments of the present invention.

FIG. 20 is a flowchart illustrating a process for providing the authentication image on media tuned to a specific decoder lens. Before or after data is recorded on the media, and before, during or after other security features such as holograms are provided on the non-data carrying surface of the media, the authentication image may be applied to the media in step 216. In step 218, a robotic arm or other conveyance system may obtain a digital media from a spindle or other source location. The media may be rotated to the desired orientation in step 220, and the media may be inserted into the packaging in the desired orientation in step 222.

Digital media such as optical disks are typically mounted on a circular hub within packaging. Thus, it may be necessary to secure the digital media in a fixed position within the packaging to prevent the media from rotating or otherwise moving so as to ensure that the authentication image remains aligned with the view port. A tape or some other restraining mechanism may be applied to the media in step 224 to maintain the media in the desired orientation within the packaging. In an embodiment where the authentication image comprises a concentric annular ring, the orienting step 222 and the restraining step 224 may be omitted, and the media may be left free to rotate within the packaging without concern for alignment of the authentication image with the view port. This is because a portion of the annular ring will be aligned under the decoder lens regardless of the rotational orientation of the media and ring.

In embodiments described above, the authenticity security system may be used to provide a quick and easy method for authenticating a source of the media at, for example, a point of sale. In an alternative embodiment, in addition to or instead of integrating the decoder lens 112 into packaging 102, decoder lens 112 may be formed on a tool independent of packaging 102. In such embodiments, the decoder lens tool may be used to authenticate media before it is packaged, as for example during the various fabrication stages of the media. Such a decoder lens tool may additionally be used by law enforcement and in legal proceedings to quickly and easily establish the authenticity of digital media.

While embodiments of the present invention have been described with reference to a system for authenticating a source of digital media, it is further understood that the principles of the present invention may be used as part of a marketing campaign where an end user may receive a benefit if a particular image is seen when viewed through decoder lens 112 at, for example, a point of sale.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. Packaging for one or more digital media, a digital media of the one or more digital media including a visual image not visible to the naked eye, the packaging comprising:
   one or more view ports, a view port of the one or more view ports providing a direct line of site through a layer of the packaging to a surface of the digital media within the packaging; and
   a decoding lens provided within the view port, the decoding lens capable of revealing the visual image on the digital media.

2. Packaging as recited in claim 1, the view port comprising an opening formed within opaque packaging.

3. Packaging as recited in claim 1, the visual image comprising an area surrounding the decoder lens within a portion of translucent packaging.

4. Packaging as recited in claim 1, the decoding lens comprising a diffraction grating.

5. A system for authenticating a source of digital media, comprising:
   a digital media including a visual image not visible to the naked eye; and
   packaging for the digital media, the packaging including:
   one or more view ports, a view port of the one or more view ports providing a direct line of site through a layer of the packaging to a surface of the digital media within the packaging, and
   a decoding lens provided within the view port, the decoding lens capable of revealing the visual image on the digital media.

6. A system as recited in claim 5, the visual image comprising at least one of a hologram, a stereogram, a two-dimensional image and a three-dimensional image.

7. A system as recited in claim 5, the visual image comprising at least one of an object, a logo, a word, a letter and a number.

8. A system as recited in claim 5, the visual image comprising one of a static image and a dynamic image.

9. A system as recited in claim 5, the digital media comprising one of optical media and flash memory devices.

10. A system as recited in claim 5, the view port comprising an opening formed within opaque packaging.

11. A system as recited in claim 5, the visual image comprising an area surrounding the decoder lens within a portion of translucent packaging.

12. A system as recited in claim 5, the decoding lens comprising a diffraction grating.

13. A system as recited in claim 5, wherein the entire visual image may be viewed all at once through decoding lens.

14. A system as recited in claim 5, wherein a portion of visual image may be viewed through decoding lens at a given time.

15. A system as recited in claim 14, wherein the visual image is annular and concentric with an outer diameter of the media.

16. A system as recited in claim 5, a portion of the packaging overlying the visual image on the media including, in at least one arrangement of the packaging, a plurality of layers, the one or more view ports comprising a plurality of view ports, one view port in each layer of packaging overlying the visual image.

17. A system as recited in claim 16, the decoding lens provided in one view port of the plurality of view ports.

18. A method of authenticating a source of digital media, comprising the step of viewing an image on a surface of a digital media through a decoder lens provided in a view port in packaging for the digital media, the decoder lens revealing an image not visible to the naked eye if the source of the digital media is authentic.

19. A method as recited in claim 18, further comprising the step of positioning the digital media in a desired orientation with respect to the packaging before placing the media within the packaging.

20. A method as recited in claim 19, further comprising the step of securing the media the desired position to maintain the visual image in a desired relation with respect to the view port.

\* \* \* \* \*